US012563241B2

(12) United States Patent
Wang et al.

(10) Patent No.: US 12,563,241 B2
(45) Date of Patent: Feb. 24, 2026

(54) INTERACTIVE METHOD AND APPARATUS, ELECTRONIC DEVICE, AND STORAGE MEDIUM

(71) Applicant: Beijing Zitiao Network Technology Co., Ltd., Beijing (CN)

(72) Inventors: Jiahao Wang, Beijing (CN); Wenjie Wang, Beijing (CN); Jin Huang, Beijing (CN); Shiting Zhou, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/607,023

(22) Filed: Mar. 15, 2024

(65) Prior Publication Data

US 2024/0223823 A1    Jul. 4, 2024

Related U.S. Application Data

(63) Continuation of application No. PCT/CN2022/119058, filed on Sep. 15, 2022.

(30) Foreign Application Priority Data

Sep. 15, 2021    (CN) .......................... 202111082168.8

(51) Int. Cl.
*H04N 21/2187*      (2011.01)
*H04N 21/431*       (2011.01)
(52) U.S. Cl.
CPC ..... *H04N 21/2187* (2013.01); *H04N 21/4312* (2013.01)

(58) Field of Classification Search
None
See application file for complete search history.

(56) References Cited

U.S. PATENT DOCUMENTS 10,835,828 B1 * 11/2020 Pather ................... A63F 13/213
11,616,990 B2 *  3/2023 Li ..................... H04N 21/41407
                                                          725/93
(Continued)

FOREIGN PATENT DOCUMENTS

CN       108900920 A     11/2018
CN       109195001 A      1/2019
(Continued)

OTHER PUBLICATIONS

International Search Report and Written Opinion for PCT/CN2022/119058, mailed Nov. 28, 2022, 13 pages.
(Continued)

*Primary Examiner* — Mushfikh I Alam
(74) *Attorney, Agent, or Firm* — Astute IP Law Group

(57) ABSTRACT

The present disclosure provides an interactive method and apparatus, an electronic device, and a storage medium. The method includes: receiving an effect instruction; identifying an effect type corresponding to the effect instruction; if the effect type is a first type, triggering a first effect in the first livestreaming party, and triggering an effect corresponding to the first effect in at least one second livestreaming party; if the effect type is a second type, triggering a second effect in the first livestreaming party; and playing corresponding interaction effects in the first livestreaming party and the at least one second livestreaming party, respectively.

19 Claims, 3 Drawing Sheets

(56) References Cited

U.S. PATENT DOCUMENTS

| | | | |
|---|---|---|---|
| 2011/0047464 A1* | 2/2011 | McCarthy | H04N 21/4781 |
| | | | 715/733 |
| 2016/0074751 A1* | 3/2016 | Zhang | A63F 13/213 |
| | | | 463/31 |
| 2018/0184171 A1 | 6/2018 | Danker et al. | |
| 2019/0096113 A1* | 3/2019 | Stukalov | G06T 11/60 |
| 2020/0065853 A1* | 2/2020 | Cvinar | G06Q 30/0276 |
| 2021/0306700 A1* | 9/2021 | Xie | H04N 21/4756 |
| 2022/0191557 A1* | 6/2022 | Zhang | G06Q 30/0201 |
| 2022/0224950 A1* | 7/2022 | Zhang | H04N 21/6547 |
| 2022/0303605 A1* | 9/2022 | Zhang | H04N 21/6587 |
| 2022/0345782 A1* | 10/2022 | Kojima | G06F 13/00 |
| 2022/0385952 A1* | 12/2022 | Sun | H04N 21/812 |
| 2022/0417566 A1* | 12/2022 | Tang | H04N 21/4312 |
| 2023/0009336 A1* | 1/2023 | Tang | H04N 21/234 |
| 2023/0011255 A1* | 1/2023 | Tang | H04N 21/2668 |
| 2023/0123269 A1* | 4/2023 | Kojima | H04N 21/2393 |
| | | | 725/1 |
| 2023/0412853 A1* | 12/2023 | Cai | H04N 7/15 |
| 2024/0305836 A1* | 9/2024 | Zhao | H04N 21/431 |
| 2025/0142137 A1* | 5/2025 | Tan | H04N 21/4788 |

FOREIGN PATENT DOCUMENTS

| | | | |
|---|---|---|---|
| CN | 110213608 A | 9/2019 | |
| CN | 110944235 A | 3/2020 | |
| CN | 111277854 A | 6/2020 | |
| CN | 113014935 A | 6/2021 | |
| JP | 2003019353 A | 1/2003 | |
| JP | 2020017871 A | 1/2020 | |
| WO | 2018011947 A1 | 1/2018 | |
| WO | 2021114710 A1 | 6/2021 | |
| WO | 2021159825 A1 | 8/2021 | |

OTHER PUBLICATIONS

Extended European Search Report for European Patent Application No. 22869338.8, mailed on Sep. 19, 2024.

Notice of Reasons for Refusal for Japanese Patent Application No. 2023-578186, mailed on Dec. 3, 2024, 11 pages.

Office Action for Japanese Patent Application No. 2023-578186, mailed on Sep. 24, 2025, 8 pages.

* cited by examiner

Receiving module 301

Identification module 302

Attack special effect module 303

Defense special effect module 304

Special effect playing module 305

400

| Processing apparatus 401 | ROM 402 | RAM 403 |
| --- | --- | --- |

404

405

I/O interface

| Input apparatus 406 | Output apparatus 407 | Storage apparatus 408 | Communication apparatus 409 |
| --- | --- | --- | --- |

INTERACTIVE METHOD AND APPARATUS, ELECTRONIC DEVICE, AND STORAGE MEDIUM

CROSS-REFERENCE TO RELATED APPLICATION

The present application is a continuation of International Patent Application No. PCT/CN2022/119058, filed on Sep. 15, 2022, which claims priority of the Chinese Patent Application No. 202111082168.8, filed to on Sep. 15, 2021, and the entire content disclosed by the aforementioned patent applications is incorporated herein by reference as part of the present application.

TECHNICAL FIELD

The present disclosure relates to the field of interaction, and in particular, to an interactive method and apparatus, an electronic device, and a storage medium.

BACKGROUND

With the development of video technologies and the popularization of the Internet, video websites exist in entertainment, life, and office, and have totally become a part of our lives. Livestreaming is a product of the video Internet, and can not only be applied to entertainment scenarios, but also can be used in games, E-commerce, education, and other scenarios, and thus is very popular among people. Then a variety of livestreaming industries have emerged. All walks of life and all aspects of life can be used as a livestreaming industry, which may be in the form of a single person's livestreaming, or a multi-person's livestreaming, or a livestreaming battle (PK) between a plurality of live streamers.

At present, during the livestreaming PK process, the interaction between a user and other live streamer and the interaction between a user and other user are relatively weak, and there is no direct playing method to provide help.

SUMMARY

In order to at least solve the above technical problems, the embodiments of the present disclosure aim to provide an interactive method and apparatus, an electronic device, and a storage medium.

In a first aspect, the present disclosure provides an interactive method for livestreaming battle, comprising:

receiving a special effect instruction that is triggered;

identifying a special effect type corresponding to the special effect instruction;

when it is identified that the special effect type is an attack type, triggering an attack special effect in an own-side livestreaming room, and simultaneously triggering a special effect of being attacked in at least one opposite-side livestreaming room;

when it is identified that the special effect type is a defense type, triggering a defense special effect in the own-side livestreaming room; and playing corresponding interaction special effects in the own-side livestreaming room and the at least one opposite-side livestreaming room, respectively.

Further, the special effect instruction that is triggered comprises:

a special effect instruction triggered by receiving a gift in the own-side livestreaming room, and/or a special effect instruction triggered by identifying a specific action or voice of a live streamer.

Further, after triggering the special effect of being attacked and/or the defense special effect, a battle numerical value effect is played during playing the special effect of being attacked and/or the defense special effect or after the special effect of being attacked and/or the defense special effect are played.

Further, after the triggering a special effect of being attacked in at least one opposite-side livestreaming room, the method further comprises:

determining whether the special effect of being attacked interacts with an original lingering special effect in the opposite-side livestreaming room;

in a case of yes, interacting the special effect of being attacked with the original lingering special effect, and updating an effect of the original lingering special effect and the battle numerical value effect; and in a case of no, generating, based on the special effect of being attacked, a new lingering special effect in the opposite-side livestreaming room, generating special effects based on the new lingering special effect and the original lingering special effect, respectively, and continuously generating battle numerical value effects.

Further, after the triggering a defense special effect in the own-side livestreaming room, the method further comprises:

determining whether the defense special effect interacts with an original lingering special effect in the own-side livestreaming room;

in a case of yes, interacting the defense special effect with the original lingering special effect, and updating an effect of the original lingering special effect and the battle numerical value effect; and in a case of no, generating, based on the defense special effect, a new lingering special effect in the own-side livestreaming room, generating special effects based on the new lingering special effect and the original lingering special effect, respectively, and not generating the battle numerical value effect.

Further, the interacting comprises enhancement, mutation, or counteraction, and an enhancement special effect, a counteraction special effect, or a mutation special effect, which correspond to the enhancement, the counteraction, or the mutation, respectively, are generated according to the interacting.

Further, the generating an enhancement special effect, a counteraction special effect, or a mutation special effect, which correspond to the enhancement, the counteraction, or the mutation, respectively, according to the interacting comprises:

enhancing at least one special effect of being attacked and at least one other special effect of being attacked that are played in a same livestreaming room, playing the enhancement special effect, and playing a numerical value effect corresponding to numerical value superposition enhancement between special effects that are capable of being enhanced;

counteracting at least one special effect of being attacked with at least one defense special effect that are played in a same livestreaming room, and playing the counteraction special effect, and playing a numerical value special effect corresponding to difference value counteraction between special effects that are capable of being counteracted; and when a numerical value corresponding to the enhancement special effect increases to a first threshold, triggering a corresponding mutation special effect and playing a corresponding numerical value special effect, or when a numerical value corresponding to the counteraction special effect decreases to a second threshold, triggering a corresponding mutation special effect and playing a corresponding numerical value special effect.

Further, the method further comprises:

at an end of a livestreaming battle stage, clearing lingering special effects in all livestreaming rooms; and calculating total points values corresponding to the all livestreaming rooms, respectively, determining that a livestreaming room with a highest total points value is a winner, and playing a winning special effect in the livestreaming room with the highest total points value.

In a second aspect, the present disclosure provides an interactive method, comprising: receiving an effect instruction; if an effect type corresponding to the effect instruction is a first type, triggering a first effect in the first livestreaming party, and triggering an effect corresponding to the first effect in at least one second livestreaming party; if the effect type corresponding to the effect instruction is a second type, triggering a second effect in the first livestreaming party; and playing corresponding interaction effects in the first livestreaming party and the at least one second livestreaming party, respectively.

Further, the effect instruction comprises: an effect instruction triggered by receiving a gift in the first livestreaming party, and/or an effect instruction triggered by identifying a specific action or voice of a live streamer.

Further, after triggering the effect corresponding to the first effect and/or the second effect, a battle numerical value effect is played during playing the effect corresponding to the first effect and/or the second effect or after the effect corresponding to the first effect and/or the second effect are played.

Further, after the triggering an effect corresponding to the first effect in at least one second livestreaming party, the method further comprises: determining whether the effect corresponding to the first effect interacts with an original lingering effect in the second livestreaming party; in a case of yes, interacting the effect corresponding to the first effect with the original lingering effect, and updating an effect of the original lingering effect and the battle numerical value effect; and in a case of no, generating, based on the effect corresponding to the first effect, a new lingering effect in the second livestreaming party, generating effects based on the new lingering effect and the original lingering effect, respectively, and continuously generating battle numerical value effects.

Further, after the triggering a second effect in the first livestreaming party, the method further comprises: determining whether the second effect interacts with an original lingering effect in the first livestreaming party; in a case of yes, interacting the second effect with the original lingering effect, and updating an effect of the original lingering effect and the battle numerical value effect; and in a case of no, generating, based on the second effect, a new lingering effect in the second livestreaming party, generating effects based on the new lingering effect and the original lingering effect, respectively, and not generating the battle numerical value effect.

Further, the interacting comprises enhancement, mutation, or counteraction, and an enhancement effect, a counteraction effect, or a mutation effect, which correspond to the enhancement, the counteraction, or the mutation, respectively, are generated according to the interacting.

Further, the generating an enhancement effect, a counteraction effect, or a mutation effect, which correspond to the enhancement, the counteraction, or the mutation, respectively, according to the interacting comprises: enhancing at least one effect corresponding to the first effect and at least one other effect corresponding to the first effect that are played in a same livestreaming party, playing the enhancement effect, and playing a numerical value effect corresponding to numerical value superposition enhancement between effects that are capable of being enhanced; counteracting at least one effect corresponding to the first effect with at least one second effect that are played in a same livestreaming party, and playing the counteraction effect, and playing a numerical value effect corresponding to difference value counteraction between effects that are capable of being counteracted; and when a numerical value corresponding to the enhancement effect increases to a first threshold, triggering a corresponding mutation effect and playing a corresponding numerical value effect, or when a numerical value corresponding to the counteraction effect decreases to a second threshold, triggering a corresponding mutation effect and playing a corresponding numerical value effect.

Further, the method further comprises: at an end of a livestreaming battle stage, clearing lingering effects in all livestreaming parties; and calculating total points values corresponding to the all livestreaming parties, respectively, determining that a livestreaming party with a highest total points value is a winner, and playing a winning effect in the livestreaming party with the highest total points value.

Further, before triggering the first effect or the second effect, the method further comprises: identifying the special effect type corresponding to the special effect instruction.

Further, the first type is opposite to the second type, and the first effect is opposite to the second effect.

Further, the first type is an attack type, the first effect is an attack effect, the second type is a defense type, the second effect is a defense effect, and the effect corresponding to the first effect is an effect of being attacked.

In a third aspect, the present disclosure provides an interactive method, comprising: receiving an effect instruction; and if an effect type corresponding to the effect instruction is a first type, triggering to play a first effect corresponding to a first livestreaming party, and triggering to play a second effect corresponding to at least one second livestreaming party.

Further, if the effect type corresponding to the effect instruction is a second type, triggering to play a second third effect in corresponding to the first livestreaming party, and triggering to play a fourth effect corresponding to the at least one second livestreaming party.

Further, the interactive method is applied to a live streamer party.

Further, the first type is opposite to the second type, and the first effect is opposite to the third effect.

Further, the first type is an attack type, the first effect is an attack effect, the second type is a defense type, the third effect is a defense effect, and the second effect is an effect of being attacked or a defense effect.

In a fourth aspect, the present disclosure provides an interactive apparatus, comprising:

a receiving module, configured to receive a special effect instruction that is triggered;

an identification module, configured to identify a special effect type corresponding to the special effect instruction;

an attack special effect module, configured to, when it is identified that the special effect type is an attack type, trigger an attack special effect in an own-side livestreaming room and simultaneously trigger a special effect of being attacked in at least one opposite-side livestreaming room;

a defense special effect module, configured to trigger a defense special effect in the own-side livestreaming room when it is identified that the special effect type is a defense type; and a special effect playing module, configured to play corresponding interaction special effects in the own-side livestreaming room and the at least one opposite-side livestreaming room, respectively.

In a fifth aspect, the present disclosure provides an interactive apparatus, comprising: a receiving module, configured to receive an effect instruction; a first effect module, configured to, if an effect type corresponding to the effect instruction is a first type, trigger a first effect in the first livestreaming party and trigger an effect corresponding to the first effect in at least one second livestreaming party; a second effect module, configured to trigger a second effect in the first livestreaming party if the effect type corresponding to the effect instruction is a second type; and an effect playing module, configured to play corresponding interaction effects in the first livestreaming party and the at least one second livestreaming party, respectively.

In a sixth aspect, the present disclosure provides an interactive apparatus, comprising: a receiving module, configured to receive an effect instruction; a first effect module, configured to, if an effect type corresponding to the effect instruction is a first type, trigger to play a first effect corresponding to a first livestreaming party and trigger to play a second effect corresponding to at least one second livestreaming party.

In a seventh aspect, the present disclosure provides an electronic device, comprising:

a memory, configured to store a computer-readable instruction; and a processor, configured to execute the computer-readable instruction so as to enable the electronic device to implement the method described in any one of the above first aspect.

In a eighth aspect, the present disclosure provides a computer-readable storage medium, the computer-readable storage medium stores a program, when the program is executed, the method described in any one of the above first aspect and the second aspect can be implemented.

The above description is only an overview of the technical solutions of the present disclosure, and can be implemented according to the content of the specification in order to have a clearer understanding of the technical means of the present disclosure, and in order to make the above and other objects, features, and advantages of the present disclosure more apparent and comprehensible, preferred embodiments will be described in detail below with reference to the accompanying drawings.

DETAILED DESCRIPTION

Figure 1A:
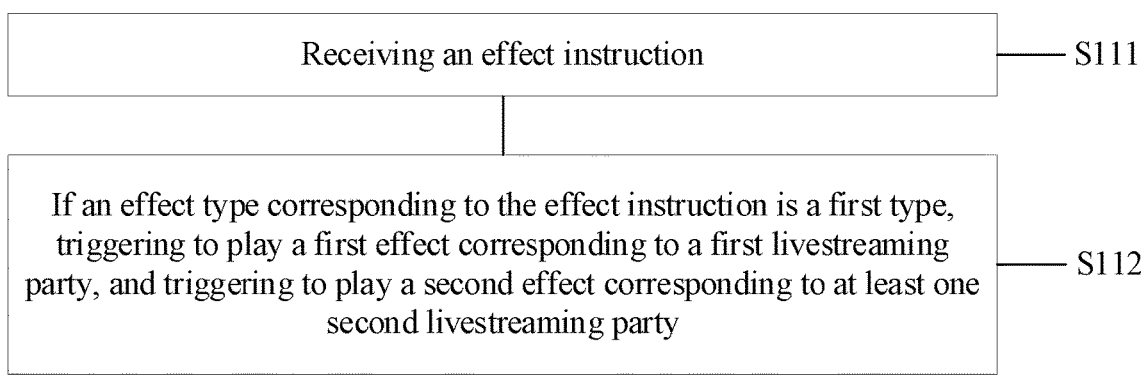
FIG. 1A is a schematic flowchart of an interactive method provided by an embodiment of the present disclosure.

In order to describe the technical content of the present disclosure more clearly, the following will be further described with reference to specific embodiments.

The implementations described in the following exemplary embodiments do not represent all implementations consistent with the present disclosure. Rather, they are merely examples of apparatuses and methods consistent with some aspects of the present disclosure detailed in the appended claims.

Embodiments of the present disclosure will be described in greater detail below with reference to the accompanying drawings. While some embodiments of the present disclosure are shown in the accompanying drawings, it should be understood, however, that the present disclosure may be implemented in various forms and should not be construed as being limited to the embodiments set forth herein; on the contrary, these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that all the steps recorded in the implementations of the method provided by the present disclosure can be performed in different order, and/or performed in parallel. Further, the implementations of the method can include additional steps and/or omit performing the steps illustrated. The scope of the present disclosure is not limited in this respect.

The term "comprise/include" and variations thereof as used herein mean openly comprising/including, i.e. "comprising/including but not limited to". The term "based on" is "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first", "second", etc. mentioned in the present disclosure are only used for distinguishing different devices, modules, or units, and are not intended to limit the order or interdependence of the functions performed by these devices, modules, or units.

It should be noted that the modifications of "one" and "plurality" mentioned in the present disclosure are schematic rather than restrictive, and those skilled in the art should understand that unless otherwise expressly indicated in the context, it should be understood as "one or more".

The terminology used in the present disclosure is only for the purpose of describing particular embodiments and is not intended to limit the present disclosure. As used in the present disclosure and the appended claims, the singular forms "a", "an", and "the" are also intended to include the plural forms, unless the context clearly indicates other meaning. The disclosed embodiments are described in detail below with reference to the accompanying drawings.

Figure 1B:
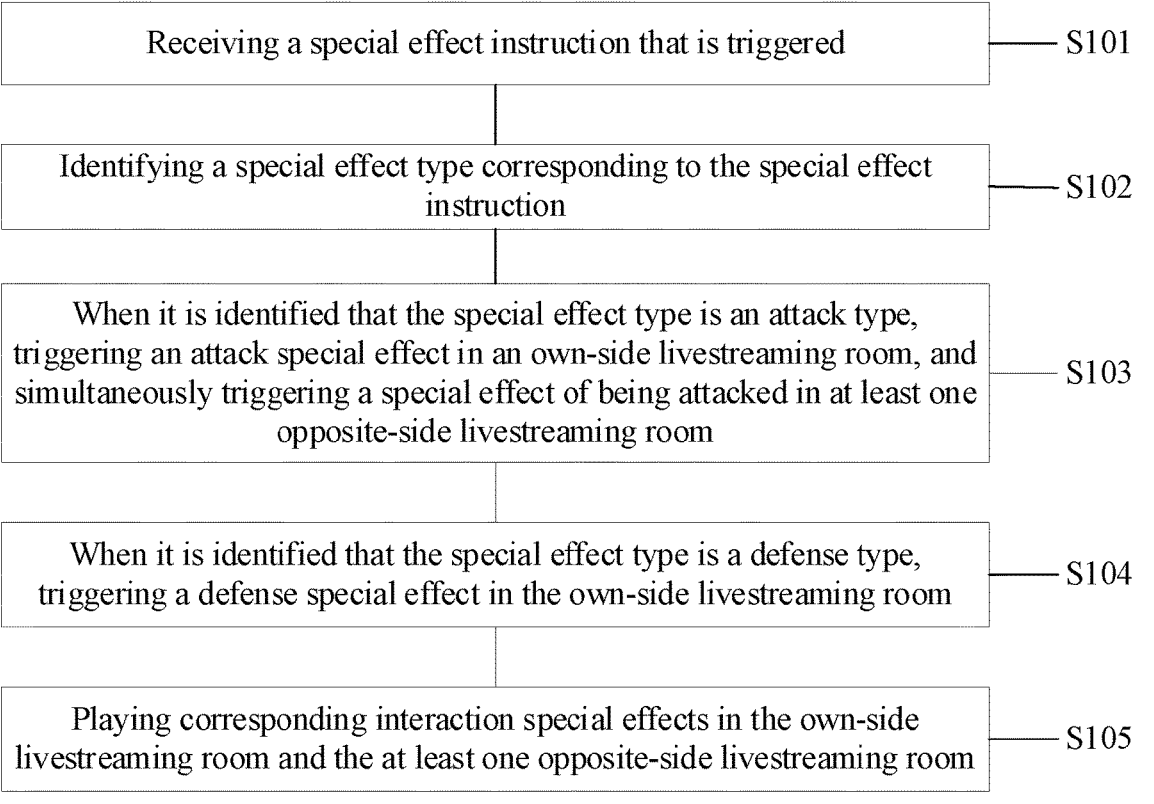
FIG. 1B is a schematic flowchart of an interactive method provided by an embodiment of the present disclosure.

FIG. 1A is a schematic flowchart of an interactive method according to an embodiment of the present disclosure, FIG. 1B is a schematic flowchart of an interactive method provided by an embodiment of the present disclosure. The interactive method provided by the embodiment may be executed by an interactive apparatus. The interactive apparatus may be implemented as software or a combination of software and hardware. The interactive apparatus may be integrated in a certain device in an interaction system, such as a terminal device, a service device, and the Internet.

As shown in FIG. 1A, an interactive method comprises the following steps S111-S112.

Step S111: receiving an effect instruction.

Step S112: if an effect type corresponding to the effect instruction is a first type, triggering to play a first effect corresponding to a first livestreaming party, and triggering to play a second effect corresponding to at least one second livestreaming party.

In an example, if the effect type corresponding to the effect instruction is a second type, triggering to play a third effect corresponding to the first livestreaming party (first livestreaming room, or first livestreaming channel), and triggering to play a fourth effect corresponding to the at least one second livestreaming party.

In an example, the interactive method is applied to a live streamer party.

In an example, if an effect type corresponding to the effect instruction is a first type, triggering a first effect in the first livestreaming party, and triggering an effect corresponding to the first effect in at least one second livestreaming party (second livestreaming room, or second livestreaming channel); if the effect type corresponding to the effect instruction is a second type, triggering a third effect in the first livestreaming party; and playing corresponding interaction effects in the first livestreaming party and the at least one second livestreaming party, respectively.

For example, the first livestreaming party and the second livestreaming party are different livestreaming parties, the first livestreaming party may be an own-side livestreaming party and the second livestreaming party may be an opposite-side livestreaming party.

In an example, before triggering to play the first effect and the second effect, the method further comprises: identifying the effect type corresponding to the effect instruction.

In an example, the first type is different from the third type, the first effect is different from the second effect, and the first effect is different from the third effect.

In an example, the third effect is different from the fourth effect. The first effect may be the same as the fourth effect.

In an example, the first type is opposite to the third type, and the first effect is opposite to the third effect. The first effect and/or the fourth effect are effects of the first type, and the second effect and/or the third effect are effects of the second type. For example, the first effect and the fourth effect may be the same effect or the same type of effect. The second effect and the third effect may be the same effect or the same type of effect. The first effect and the second effect may be different effects of the same type, or may be effects of different types, such as opposite types of effects. The third effect and the fourth effect may be different effects of the same type, or may be effects of different types, such as opposite types of effects. The first type is, for example, an attack type, and the second type is, for example, a defense type.

As an example, the first type is an attack type, the first effect is an attack effect, the second type is a defense type, the third effect is a defense effect, the second effect is an effect of being attacked or a defense effect, and the fourth effect may be an attack effect, the livestreaming party is a livestreaming room. The following description is described by taking the above case as an example.

Figure 2:
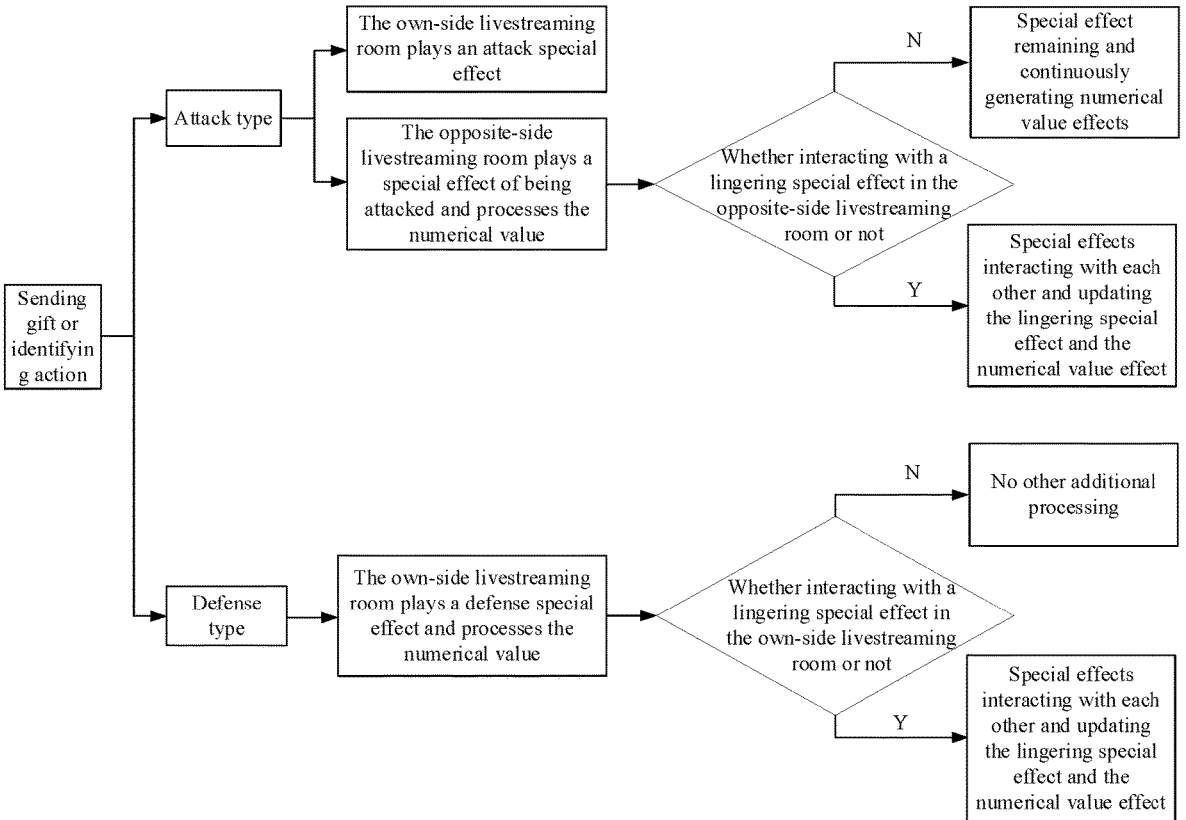
FIG. 2 is a schematic flowchart of playing special effects between livestreaming rooms provided by an embodiment of the present disclosure.

As shown in FIG. 1B, with reference to the schematic flowchart of playing special effects between livestreaming rooms shown in FIG. 2, the method includes the following steps.

Step S101: receiving an effect instruction that is triggered.

In this embodiment, with reference to FIG. 2, the scenario of the present disclosure is a battle interaction between livestreaming rooms. For example, two live streamers perform talent shows and are connected to each other for a livestreaming battle (PK) to compete for popularity and gift incomes. The corresponding interaction special effects are displayed on the playing interfaces of the two livestreaming rooms to increase the interactivity of the livestreaming, increase the sensory stimulation of the user, and improve the incomes from the livestreaming. Certainly, a livestreaming battle may also be held among a plurality of live streamers, either in the same industry or across industries. The livestreaming battle in the present disclosure is not limited to this.

Herein, the effect instruction that is triggered includes: an effect instruction triggered by receiving a gift in the own-side livestreaming room, and/or an effect instruction triggered by identifying a specific action or voice of a live streamer. There are many types of gifts received, from viewers, in the own-side livestreaming room, such as flowers, diamonds, castles, special snacks, and the like. Each gift corresponds to a different numerical value, which may be subsequently converted into a corresponding numerical value special effect. When the viewer gives the gift to the live streamer, different gifts trigger corresponding special effects, respectively. Generally speaking, a gift with a higher value may correspond to a richer special effect.

In addition, the live streamer may also use the specific action or voice to actively initiate an attack on the other livestreaming rooms, or use the specific action or voice to trigger a passive defense against the attack from the opponent when the own-side livestreaming room is attacked by the opponent. Herein, the specific action may be an attacking gesture, a martial arts action, and the like, such as a fist action, a palm action, arm crossing, or specific martial arts movement and posture. The specific voice may be attacking-type words, such as a simple voice "attacking" and so on. These specific actions and specific voices are pre-stored in a server and have a corresponding relationship with the corresponding special effects. This corresponding relationship is also preset in the server. During the livestreaming process, specific actions and specific voices of a live streamer are identified through image recognition and then converted into corresponding special effects. When the live streamer initiates an attack or engages in passive defense, it is necessary to deduct the corresponding special effect points, which will be reflected in the total points of the livestreaming room.

In the embodiments of the present disclosure, the interaction may occur between the special effects generated for the same gift or different gifts. The interaction includes enhancement, mutation, or counteraction, and the and enhancement special effect, the counteraction special effect, or the mutation special effect, which correspond to the enhancement, the counteraction, or the mutation, respectively, are generated according to the interaction.

Step S102: identifying a special effect type corresponding to the effect instruction.

In step S102, there are many types of gifts received from the viewers in the livestreaming room. Each gift corresponds to a different numerical value, which may be subsequently converted into a corresponding numerical value special effect. These gifts may be classified into an attack type and a defense type according to their attributes. When the viewers reward a live streamer with gifts, different gifts respectively trigger corresponding special effects, which is mainly divided into the following cases:

(1) when a common gift such as a flower and a castle is given, the special effect of the gift may be played directly or may be converted into the attack type special effect or the defense type special effect for playing;

(2) for an attack type gift, an attack special effect is played directly in the own-side livestreaming room and a special effect of being attacked is played in the opposite-side livestreaming room; and (3) for a defense type gift, a defense special effect is played directly in the own-side livestreaming room and interacts with the special effect of being attacked that remains in the own-side livestreaming room, and then the interaction special effect is played.

Moreover, the specific action or voice adopted by the live streamer may also trigger an attack special effect or a defense special effect. For example, the live streamer may actively initiate an attack on the other livestreaming rooms, or can use the specific action or voice to trigger a passive defense against the attack from the opponent when the own-side livestreaming room is attacked by the opponent. Herein:

1) For an attack special effect triggered by a specific action, the specific action may be: an attacking gesture, a martial arts action, and the like, such as a fist action, a palm action, arm crossing, or specific martial arts movement and posture. The specific voice may be attacking-type words, such as a simple voice "attacking" and the like.

2) For a defense special effect triggered by a specific action, the specific action may be: raising hands close to the chest or head, holding shoulders with both hands, specific martial arts movement and posture, and the like. The specific voice may be defense-type words, such as "defense" and the like.

Obvious logos or prominent fonts may be displayed for special effects of different types. For example, a "crossed swords" logo may be displayed in a prominent position of an attack type special effect, or an "attack" or "offense" word may be directly displayed in the style of special artistic words. A "shield" logo is displayed in a prominent position of a defense type special effect, or a "guard" or "defense" word is directly displayed in the style of special artistic words. Special effects of the same or different types may interact with each other, and the interactions produce corresponding enhancement special effect, counteraction special effect, or mutation special effect.

Step S103: when it is identified that the special effect type is an attack type, triggering an attack special effect in an own-side livestreaming room, and simultaneously triggering a special effect of being attacked in at least one opposite-side livestreaming room.

Step S104: when it is identified that the special effect type is a defense type, triggering a defense special effect in the own-side livestreaming room.

In the above steps S103 and S104, based on the identification result of the special effect type in step S102, if it is identified that the special effect type is an attack type, the attack special effect is triggered in the own-side livestreaming room, and meanwhile, the special effect of being attacked is triggered in at least one opposite-side livestreaming room; if it is identified that the special effect type is a defense type, the defense special effect is triggered in the own-side livestreaming room.

In the embodiments of the present disclosure, after the special effect of being attacked and/or the defense special effect is triggered, a battle numerical value effect is played during playing the special effect of being attacked and/or the defense special effect or after the special effect of being attacked and/or the defense special effect are played. Referring to FIG. 2, after triggering the special effect of being attacked in the opposite-side livestreaming room, the method further includes: determining whether the special effect of being attacked interacts with an original lingering special effect in the opposite-side livestreaming room; if yes, interacting the special effect of being attacked with the original lingering special effect, and updating an effect of the original lingering special effect and the battle numerical value effect; and if no, generating, based on the special effect of being attacked, a new lingering special effect in the opposite-side livestreaming room, the new lingering special effect and the original lingering special effect producing effects of special effect, respectively, and continuously generating battle numerical value effects. And after triggering the defense special effect in the own-side livestreaming room, the method further includes: determining whether the defense special effect interacts with an original lingering special effect in the own-side livestreaming room; if yes, interacting the defense special effect with the original lingering special effect, and updating an effect of the original lingering special effect and the battle numerical value effect; and if no, generating, based on the defense special effect, a new lingering special effect in the own-side livestreaming room, the new lingering special effect and the original lingering special effect producing effects of special effect, respectively, and not generating the battle numerical value effect.

The interaction between special effects include enhancement, mutation, or counteraction, and the enhancement special effect, the counteraction special effect, or the mutation special effect, which correspond to the enhancement, the counteraction, or the mutation, respectively, are generated according to the interaction. Specifically, at least one special effect of being attacked and at least one other special effect of being attacked that are played in the same livestreaming room are enhanced, the enhancement special effect is played, and a numerical value effect corresponding to numerical value superposition enhancement between effects that are capable of being enhanced is played; at least one special effect of being attacked and at least one defense special effect that are played in the same livestreaming room are counteracted, the counteraction special effect is played, and a numerical value special effect corresponding to difference value counteraction between special effects that are capable of being counteracted is played; when a numerical value corresponding to the enhancement special effect increases to a first threshold, or when a numerical value corresponding to the counteraction special effect decreases to a second threshold, the corresponding mutation special effects are triggered, respectively, and the corresponding numerical value special effects are played. The first threshold means that when the points value corresponding to the enhancement special effect increases to a certain value, a mutation special effect is generated. The first threshold may be set with a plurality of sub-thresholds to generate the enhanced mutation special effects several times in stages. Similarly, the second threshold means that when the points value corresponding to the counteraction special effect decreases to a certain value, a mutation special effect is generated. The second threshold may also be set with a plurality of sub-thresholds to generate the counteracted mutation special effects several times in stages. The first threshold and the second threshold are set in stages according to common points values in the livestreaming room, such as hundreds, thousands, or tens of thousands.

Gifts given by the audience may be converted into the attack type special effect or the defense type special effect according to their attributes in PK scenarios, and the types may be converted in different scenarios.

1) A common gift, such as a flower and a castle, which is given is converted into the attack type first, the attack special effect and the numerical value special effect are played in the own-side livestreaming room, and meanwhile, the special effect of being attacked is played in the opposite-side livestreaming room. When the own-side livestreaming room is attacked by the opposite-side livestreaming room, the corresponding type of the gift may be converted into a defense type, so that when the own-side livestreaming room is attacked by the opposite-side livestreaming room, the mutual counteraction is performed, then the counteraction special effect is played, and the numerical value special effect corresponding to difference value counteraction between special effects that are capable of being counteracted is played.

2) A targeted attack type gift or defense type gift is given to directly trigger the attack type special effect or the defense type special effect in the own-side livestreaming room, and simultaneously trigger the special effect of being attacked in the opposite-side livestreaming room. Meanwhile, a conversion button or password may be set to achieve the conversion between the attack type and the defense type through a simple operation (such as click) or password.

Moreover, it is to be noted that when the special effect of the defense type and the special effect of the attack type can be counteracted, the corresponding numerical value ratio of the numerical value of the special effect of the defense type to the numerical value of the special effect of the attack type may be 1:1 or 1:n, where n is a natural number. That is to say, the own side can use the points value of the defense type to defend the opposite side with the same or more offensive points values with less consumption.

Step S105: playing corresponding interaction special effects in the own-side livestreaming room and the at least one opposite-side livestreaming room.

In step S105, in the own-side livestreaming room, when the viewers reward the live streamer with gifts, different gifts trigger corresponding special effects, respectively, and then the special effects are played, which is mainly divided into the following cases for playing:

1) when a common gift such as a flower and a castle is given, the special effect of the gift may be played directly or may be converted into the attack type special effect or the defense type special effect for playing, and the corresponding numerical value special effect is played;

2) for an attack type gift, an attack special effect is played directly in the own-side livestreaming room and a special effect of being attacked is played in the opposite-side livestreaming room, and the corresponding numerical value special effect is played;

3) for a defense type gift, a defense special effect is played directly in the own-side livestreaming room and interacts with the special effect of being attacked that remains in the own-side livestreaming room, the interaction special effect is played, and the interactive numerical value special effect is played;

4) when attacked by the opposite-side livestreaming room, a special effect of being attacked is played, and comprises, for example, special words such as "being attacked" or a specific logo;

5) when continuously attacked by the opposite-side livestreaming room, an effect of an enhancement special effect may be played, and a superimposed numerical value special effect is played;

6) when attacked by the opposite-side livestreaming room, the special effect of being attacked is counteracted in the own-side livestreaming room through a defense special effect; at this time, the counteraction special effect and a counteracted numerical value special effect are played in the own-side livestreaming room; and 7) when continuously attacked by the opposite-side livestreaming room and playing an enhancement special effect, if the superimposed numerical value reaches the first threshold, an enhanced mutation special effect is played; when the own-side livestreaming room is attacked by the opposite-side livestreaming room, the own-side livestreaming room makes defense and counteraction, and the counteraction special effect is played, if the counteraction numerical value decreases to the second threshold, a counteracted mutation special effect is played.

In addition, the specific action or voice adopted by the live streamer may also trigger an attack special effect or a defense special effect. For example, the live streamer may actively initiate an attack on the other livestreaming rooms, or can use the specific action or voice to trigger a passive defense against the attack from the opponent when the own-side livestreaming room is attacked by the opponent.

Herein:

1) For an attack special effect triggered by a specific action, the specific action may be: an attacking gesture, a martial arts action, and the like, such as a fist action, a palm action, arm crossing, or specific martial arts movement and posture. The specific voice may be attacking-type words, such as a simple voice "attacking" and the like.

2) For a defense special effect triggered by a specific action, the specific action may be: raising hands close to the chest or head, holding shoulders with both hands, specific martial arts movement and posture, and the like. The specific voice may be defense-type words, such as "defense" and the like.

Obvious logos or prominent fonts may be displayed for special effects of different types. For example, a "crossed swords" logo may be displayed in a prominent position of an attack type special effect, or an "attack" or "offense" word may be directly displayed in the style of special artistic words. A "shield" logo is displayed in a prominent position of a defense type special effect, or a "guard" or "defense" word is directly displayed in the style of special artistic words. Special effects of the same or different types may interact with each other, and the interactions produce corresponding enhancement special effect, counteraction special effect, or mutation special effect.

In addition, at the end of a livestreaming battle stage, lingering special effects in all the livestreaming rooms are cleared, and total points values corresponding to all the livestreaming rooms are calculated, respectively, the livestreaming room with a highest total points value is the winner and a winning special effect is played in the livestreaming room with the highest total points value. The winning special effect include, for example, celebrating victory, cheering, and the like. Certainly, if the PK is performed among a plurality of livestreaming rooms, the plurality of livestreaming rooms may be ranked according to the points values, and special effects (e.g., medal special effects) are played in the top few (such as the top three) livestreaming rooms.

In an embodiment, an interactive apparatus provided in the present disclosure comprises:

a receiving module, configured to receive an effect instruction;

a first effect module, configured to, if an effect type corresponding to the effect instruction is a first type, trigger a first effect in the first livestreaming party and trigger an effect corresponding to the first effect in at least one second livestreaming party;

a second effect module, configured to trigger a second effect in the first livestreaming party if the effect type corresponding to the effect instruction is a second type; and an effect playing module, configured to play corresponding interaction effects in the first livestreaming party and the at least one second livestreaming party, respectively.

Figure 3:
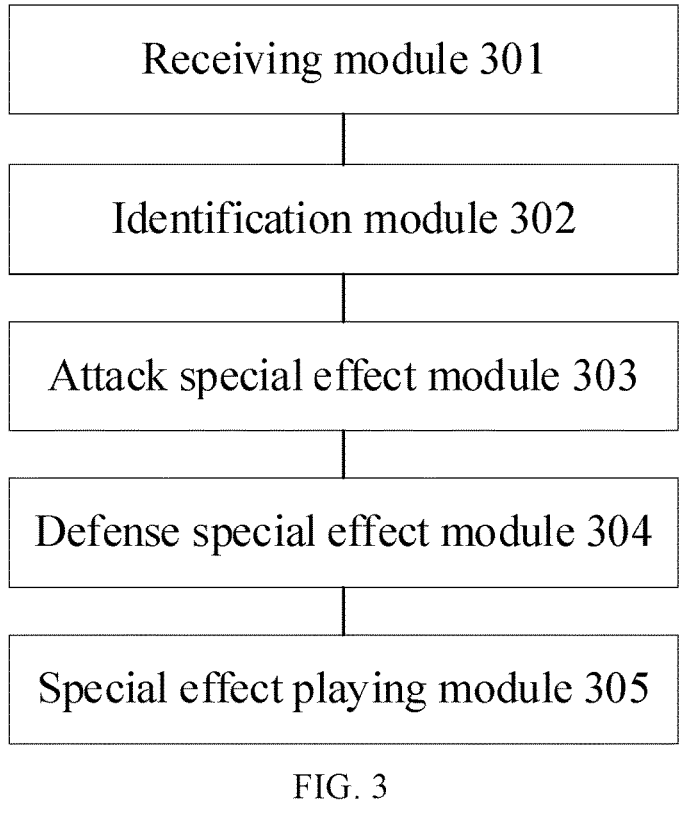
FIG. 3 is a schematic diagram of an interactive apparatus provided by another embodiment of the present disclosure.

FIG. 3 is a schematic diagram of an interactive apparatus provided by another embodiment of the present disclosure. The apparatus includes:

a receiving module 301, configured to receive an effect instruction that is triggered;

an identification module 302, configured to identify a special effect type corresponding to the effect instruction;

an attack special effect module 303, configured to, when it is identified that the special effect type is an attack type, trigger an attack special effect in an own-side livestreaming room and simultaneously trigger a special effect of being attacked in at least one opposite-side livestreaming room;

a defense special effect module 304, configured to trigger a defense special effect in the own-side livestreaming room when it is identified that the special effect type is a defense type; and a special effect playing module 305, configured to play corresponding interaction special effects in the own-side livestreaming room and the at least one opposite-side livestreaming room.

Herein, the receiving module 301 is configured to receive the effect instruction that is triggered.

In this embodiment, the effect instruction that is triggered includes: an effect instruction triggered by receiving a gift in the own-side livestreaming room, and/or an effect instruction triggered by identifying a specific action or voice of a live streamer. There are many types of gifts received, from viewers, in the own-side livestreaming room, such as flowers, diamonds, castles, special snacks, and the like. Each gift corresponds to a different numerical value, which may be subsequently converted into a corresponding numerical value special effect. When the viewer gives the gift to the live streamer, different gifts trigger corresponding special effects, respectively. Generally speaking, a gift with a higher value may correspond to a richer special effect.

In addition, the live streamer may also use the specific action or voice to actively initiate an attack on the other livestreaming rooms, or use the specific action or voice to trigger a passive defense against the attack from the opponent when the own-side livestreaming room is attacked by the opponent. Herein, the specific action may be an attacking gesture, a martial arts action, and the like, such as a fist action, a palm action, arm crossing, or specific martial arts movement and posture. The specific voice may be attacking-type words, such as a simple voice "attacking" and so on. These specific actions and specific voices are pre-stored in a server and have a corresponding relationship with the corresponding special effects. This corresponding relationship is also preset in the server. During the livestreaming process, specific actions and specific voices of a live streamer are identified through image recognition and then converted into corresponding special effects. When the live streamer initiates an attack or engages in passive defense, it is necessary to deduct the corresponding special effect points, which will be reflected in the total points of the livestreaming room.

The identification module 302 is configured to identify a special effect type corresponding to the effect instruction.

There are many types of gifts received from the viewers in the livestreaming room. Each gift corresponds to a different numerical value, which may be subsequently converted into a corresponding numerical value special effect. These gifts may be classified into an attack type and a defense type according to their attributes. When the viewers reward a live streamer with gifts, gifts of different types may trigger corresponding special effects.

Moreover, the specific action or voice adopted by the live streamer may also trigger an attack special effect or a defense special effect. For example, the live streamer may actively initiate an attack on the other livestreaming rooms, or can use the specific action or voice to trigger a passive defense against the attack from the opponent when the own-side livestreaming room is attacked by the opponent.

Obvious logos or prominent fonts may be displayed for special effects of different types. For example, a "crossed swords" logo may be displayed in a prominent position of an attack type special effect, or an "attack" or "offense" word may be directly displayed in the style of special artistic words. A "shield" logo is displayed in a prominent position of a defense type special effect, or a "guard" or "defense" word is directly displayed in the style of special artistic words. Special effects of the same or different types may interact with each other, and the interactions produce corresponding enhancement special effect, counteraction special effect, or mutation special effect.

The attack special effect module 303 is configured to, when it is identified that the special effect type is an attack type, trigger an attack special effect in an own-side livestreaming room and simultaneously trigger a special effect of being attacked in at least one opposite-side livestreaming room.

The defense special effect module 304 is configured to trigger a defense special effect in the own-side livestreaming room when it is identified that the special effect type is a defense type.

Based on the identification result of the special effect type, if it is identified that the special effect type is an attack type, the attack special effect is triggered in the own-side livestreaming room, and meanwhile, the special effect of being attacked is triggered in at least one opposite-side livestreaming room; if it is identified that the special effect type is a defense type, the defense special effect is triggered in the own-side livestreaming room.

In the embodiments of the present disclosure, after the special effect of being attacked and/or the defense special effect is triggered, a battle numerical value effect is played during playing the special effect of being attacked and/or the defense special effect or after the special effect of being attacked and/or the defense special effect are played. The attack special effect module 303 is further configured to: determine whether the special effect of being attacked interacts with a lingering special effect in the opposite-side livestreaming room; if yes, interact the special effect of being attacked with the lingering special effect, and updating an effect of the lingering special effect and the battle numerical value effect; and if no, generate, based on the special effect of being attacked, a new lingering special effect in the opposite-side livestreaming room, the new lingering special effect and the original lingering special effect producing effects of special effect, respectively, and continuously generating battle numerical value effects. The defense special effect module 304 is further configured to: determine whether the defense special effect interacts with a lingering special effect in the own-side livestreaming room; if yes, interact the defense special effect with the lingering special effect, and updating an effect of the lingering special effect and the battle numerical value effect; and if no, generate, based on the defense special effect, a new lingering special effect in the own-side livestreaming room, the new lingering special effect and the original lingering special effect producing effects of special effect, respectively, and not generating the battle numerical value effect.

The apparatus further includes: an interaction module, configured to perform the interaction of enhancement, mutation, or counteraction on the same or different special effects, and generate the enhancement special effect, the counteraction special effect, or the mutation special effect, which correspond to the enhancement, the counteraction, or the mutation, respectively, according to the interaction.

Specifically, at least one special effect of being attacked and at least one other special effect of being attacked that are played in the same livestreaming room are enhanced, the enhancement special effect is played, and a numerical value effect corresponding to numerical value superposition enhancement between effects that are capable of being enhanced is played is played; at least one special effect of being attacked and at least one defense special effect that are played in the same livestreaming room are counteracted, the counteraction special effect is played, and a numerical value special effect corresponding to difference value counteraction between special effects that are capable of being counteracted is played; when a numerical value corresponding to the enhancement special effect increases to a first threshold, or when a numerical value corresponding to the counteraction special effect decreases to a second threshold, the corresponding mutation special effects are triggered, respectively, and the corresponding numerical value special effects are played. The first threshold means that when the points value corresponding to the enhancement special effect increases to a certain value, a mutation special effect is generated. The first threshold may be set with a plurality of sub-thresholds to generate the enhanced mutation special effects several times in stages. Similarly, the second threshold means that when the points value corresponding to the counteraction special effect decreases to a certain value, a mutation special effect is generated. The second threshold may also be set with a plurality of sub-thresholds to generate the counteracted mutation special effects several times in stages. The first threshold and the second threshold are set in stages according to common points values in the livestreaming room, such as hundreds, thousands, or tens of thousands.

The apparatus further includes: an interaction module, configured to convert different types of gifts and play the converted special effects. Gifts given by the audience may be converted into the attack type special effect or the defense type special effect according to their attributes in PK scenarios, and the types may be converted in different scenarios.

1) A common gift, such as a flower and a castle, which is given is converted into the attack type first, the attack special effect and the numerical value special effect are played in the own-side livestreaming room, and meanwhile, the special effect of being attacked is played in the opposite-side livestreaming room. When the own-side livestreaming room is attacked by the opposite-side livestreaming room, the corresponding type of the gift may be converted into a defense type, so that when the own-side livestreaming room is attacked by the opposite-side livestreaming room, the mutual counteraction is performed, then the counteraction special effect is played, and the numerical value special effect corresponding to difference value counteraction between special effects that are capable of being counteracted is played.

2) A targeted attack type gift or defense type gift is given to directly trigger the attack type special effect or the defense type special effect in the own-side livestreaming room, and simultaneously trigger the special effect of being attacked in the opposite-side livestreaming room. Meanwhile, a conversion button or password may be set to achieve the conversion between the attack type and the defense type through a simple operation (such as click) or password.

Moreover, it is to be noted that when the special effect of the defense type and the special effect of the attack type can be counteracted, the corresponding numerical value ratio of the numerical value of the special effect of the defense type to the numerical value of the special effect of the attack type may be 1:1 or 1:n, where n is a natural number. That is to say, the own side can use the points value of the defense type to defend the opposite side with the same or more offensive points values with less consumption.

The special effect playing module 305 is configured to play corresponding interaction special effects in the own-side livestreaming room and the at least one opposite-side livestreaming room, respectively.

In the own-side livestreaming room, when the viewers reward the live streamer with gifts, different gifts trigger corresponding special effects, respectively, and then the special effect playing module 305 performs the playing of the special effects, which is mainly divided into the following cases for playing:

1) when a common gift such as a flower and a castle is given, the special effect of the gift may be played directly or may be converted into the attack type special effect or the defense type special effect for playing, and the corresponding numerical value special effect is played;

2) for an attack type gift, an attack special effect is played directly in the own-side livestreaming room and a special effect of being attacked is played in the opposite-side livestreaming room, and the corresponding numerical value special effect is played;

3) for a defense type gift, a defense special effect is played directly in the own-side livestreaming room and interacts with the special effect of being attacked that remains in the own-side livestreaming room, the interaction special effect is played, and the interactive numerical value special effect is played;

4) when attacked by the opposite-side livestreaming room, a special effect of being attacked is played, and comprises, for example, special words such as "being attacked" or a specific logo;

5) when continuously attacked by the opposite-side livestreaming room, an effect of an enhancement special effect may be played, and a superimposed numerical value special effect is played;

6) when attacked by the opposite-side livestreaming room, the special effect of being attacked is counteracted in the own-side livestreaming room through a defense special effect; at this time, the counteraction special effect and a counteracted numerical value special effect are played in the own-side livestreaming room; and 7) when continuously attacked by the opposite-side livestreaming room and playing an enhancement special effect, if the superimposed numerical value reaches the first threshold, an enhanced mutation special effect is played; when the own-side livestreaming room is attacked by the opposite-side livestreaming room, the own-side livestreaming room makes defense and counteraction, and the counteraction special effect is played, if the counteraction numerical value decreases to the second threshold, a counteracted mutation special effect is played.

In addition, the specific action or voice adopted by the live streamer may also trigger an attack special effect or a defense special effect. For example, the live streamer may actively initiate an attack on the other livestreaming rooms, or can use the specific action or voice to trigger a passive defense against the attack from the opponent when the own-side livestreaming room is attacked by the opponent.

Herein:

1) For an attack special effect triggered by a specific action, the specific action may be: an attacking gesture, a martial arts action, and the like, such as a fist action, a palm action, arm crossing, or specific martial arts movement and posture. The specific voice may be attacking-type words, such as a simple voice "attacking" and the like.

2) For a defense special effect triggered by a specific action, the specific action may be: raising hands close to the chest or head, holding shoulders with both hands, specific martial arts movement and posture, and the like. The specific voice may be defense-type words, such as "defense" and the like.

Obvious logos or prominent fonts may be displayed for special effects of different types. For example, a "crossed swords" logo may be displayed in a prominent position of an attack type special effect, or an "attack" or "offense" word may be directly displayed in the style of special artistic words. A "shield" logo is displayed in a prominent position of a defense type special effect, or a "guard" or "defense" word is directly displayed in the style of special artistic words. Special effects of the same or different types may interact with each other, and the interactions produce corresponding enhancement special effect, counteraction special effect, or mutation special effect.

The apparatus further includes: a clearing module and a winning module.

The clearing module is configured to clear the lingering special effects in all the livestreaming rooms at the end of a livestreaming battle stage. The winning module is configured to calculate total points values corresponding to all the livestreaming rooms, respectively, determine the livestreaming room with a highest total points value to be the winner, and display a winning special effect in the livestreaming room with the highest total points value. The winning special effect include, for example, celebrating victory, cheering, and the like. Certainly, if the PK is performed among a plurality of livestreaming rooms, the plurality of livestreaming rooms may be ranked according to the points values, and special effects (e.g., medal special effects) are played in the top few (such as the top three) livestreaming rooms.

The apparatus shown in FIG. 3 may perform the method of the embodiment shown in FIG. 1A and FIG. 1B. For parts that are not described in detail in this embodiment, reference may be made to the relevant description of the embodiment shown in FIG. 1A and FIG. 1B. For the implementation process and technical effects of the technical solution, reference is made to the description of the embodiment shown in FIG. 1A and FIG. 1B, which will not be described in detail herein again.

Figure 4:
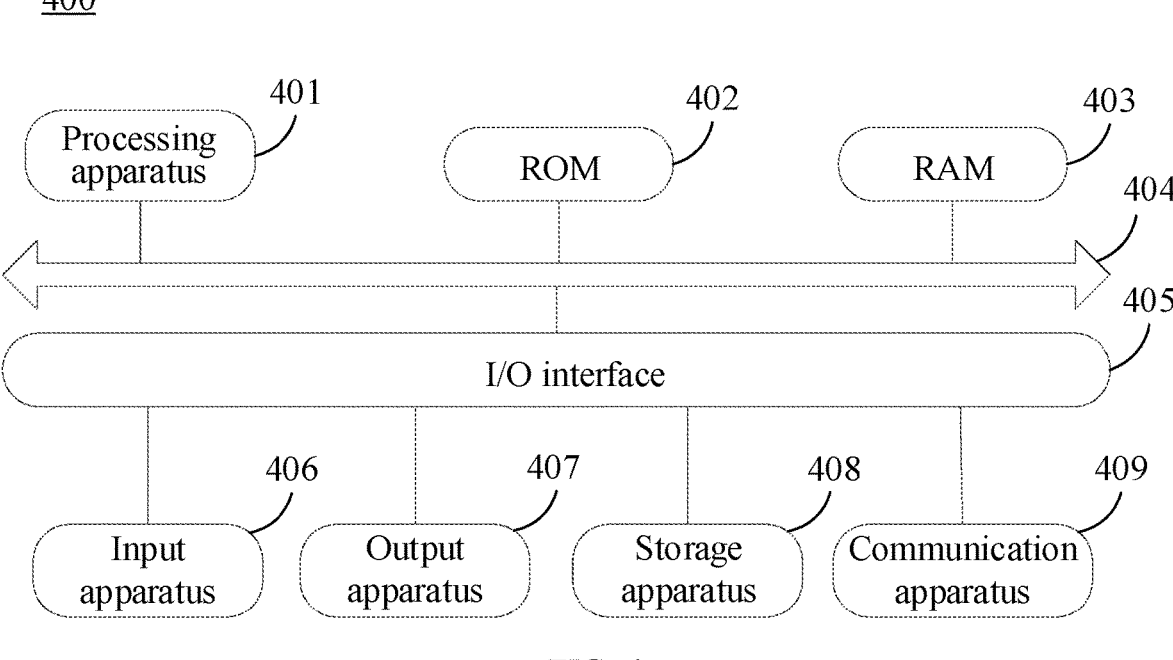
FIG. 4 is a schematic structural diagram of an electronic device provided by another embodiment of the present disclosure.

Referring to FIG. 4, FIG. 4 illustrates a schematic structural diagram of an electronic device 400 suitable for implementing another embodiment of the present disclosure. The electronic device in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 4 is merely an example, and should not pose any limitation to the functions and the range of use of the embodiments of the present disclosure.

As illustrated in FIG. 4, the electronic device 400 may include a processing apparatus 401 (e.g., a central processing unit, a graphics processing unit, etc.), which can perform various suitable actions and processing according to a program stored in a read-only memory (ROM) 402 or a program loaded from a storage apparatus 408 into a random-access memory (RAM) 403. The RAM 403 further stores various programs and data required for operations of the electronic device 400. The processing apparatus 401, the ROM 402, and the RAM 403 are connected to each other through a communication line 404. An input/output (I/O) interface 405 is also connected to the communication line 404.

Usually, the following apparatus may be connected to the I/O interface 405: an input apparatus 406 including, for example, a touch screen, a touch pad, a keyboard, a mouse, a camera, a microphone, an accelerometer, a gyroscope, or the like; an output apparatus 407 including, for example, a liquid crystal display (LCD), a loudspeaker, a vibrator, or the like; a storage apparatus 408 including, for example, a magnetic tape, a hard disk, or the like; and a communication apparatus 409. The communication apparatus 409 may allow the electronic device 400 to be in wireless or wired communication with other devices to exchange data. While FIG. 4 illustrates the electronic device 400 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried on a non-transitory computer-readable medium. The computer program includes program codes for performing the methods shown in the flowcharts. In such embodiments, the computer program may be downloaded online through the communication apparatus 409 and installed, or may be installed from the storage apparatus 408, or may be installed from the ROM 402. When the computer program is executed by the processing apparatus 401, the above-mentioned functions defined in the methods of the embodiments of the present disclosure are performed.

It should be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

In some implementations, a client and a server may communicate by using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer readable medium may be included in the electronic device described above, or may exist alone without being assembled into the electronic device.

The above-mentioned computer readable medium may carry one or more programs, when the one or more programs are executed by the electronic device, the electronic device is caused to perform the interactive method illustrated in the above embodiments.

Computer program codes for performing the operations in the present disclosure may be written in one or more programming languages or a combination thereof. The programming languages include, but are not limited to, object-oriented programming languages, such as Java, Smalltalk, and C++, and also include conventional procedural programming languages, such as "C" language or similar programming languages. The program code can be executed fully on a user's computer, executed partially on a user's computer, executed as an independent software package, executed partially on a user's computer and partially on a remote computer, or executed fully on a remote computer or a server. In the scenario involving a remote computer, the remote computer may be connected to the user's computer through any type of networks including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

The units involved in the embodiments of the present disclosure may be implemented by software, or may be implemented by hardware. The name of a unit does not constitute a limitation on the unit itself in some cases.

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include but not be limited to an electronic, magnetic, optical, electromagnetic, infrared, or semiconductor system, apparatus, or device, or any appropriate combination of them. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

According to one or more embodiments of the present disclosure, an electronic device is provided, and comprises: at least one processor; and a memory communicatively connected with the at least one processor; the memory stores instructions that can be executed by the at least one processor, and the instructions are executed by the at least one processor to enable the at least one processor to perform the method in any one of the aforementioned first aspect.

According to one or more embodiments of the present disclosure, a non-transient computer-readable storage medium is provided, and the non-transient computer-readable storage medium stores computer instructions, and the computer instructions are used to cause a computer to perform the method in any one of the aforementioned first aspect.

The foregoing descriptions are merely the illustrations of the preferred embodiments of the present disclosure and the explanations of the applied technical principles. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

The invention claimed is:

1. An interactive method, comprising:

receiving an effect instruction; and in response to an effect type corresponding to the effect instruction being a first type, playing a first effect corresponding to a first livestreaming, and playing a second effect corresponding to at least one second livestreaming, wherein the effect instruction comprises an effect instruction triggered by receiving a gift in the first livestreaming, the first effect and the second effect are related to a type of the gift received in the first livestreaming;

in response to the type of the gift received in the first livestreaming indicating the effect type being the first type, playing the first effect in the first livestreaming and playing the second effect in the at least one second livestreaming, wherein the first effect and the second effect are different;

in response to the effect type corresponding to the effect instruction being a second type, playing a third effect in the first livestreaming; and playing corresponding interaction effects in the first livestreaming and the at least one second livestreaming, respectively;

wherein the interactive method further comprises:

in response to determining the third effect or the first effect interacting with an original lingering effect in the first livestreaming:

interacting the third effect or the first effect with the original lingering effect, wherein the interacting comprises enhancement or counteraction;

generating an enhancement effect or a counteraction effect which corresponds to the enhancement or the counteraction, respectively, according to the interacting;

wherein the effects corresponding to the first effect that are played in a same livestreaming are enhanced to generate the enhancement effect, at least one effect corresponding to the first effect and at least one third effect that are played in a same livestreaming are counteracted to generate the counteraction effect.

2. The interactive method according to claim 1, further comprising:

in response to the effect type corresponding to the effect instruction being a second type, playing a fourth effect corresponding to the at least one second livestreaming.

3. The interactive method according to claim 1, wherein the interactive method is applied to a live streamer.

4. The method according to claim 1, wherein the effect instruction further comprises:

an effect instruction triggered by identifying a specific action or voice of a live streamer.

5. The method according to claim 1, wherein after playing the effect corresponding to the first effect and/or the third effect, a battle numerical value effect is played during playing the effect corresponding to the first effect and/or the third effect or after the effect corresponding to the first effect and/or the third effect are played.

6. The method according to claim 5, wherein after the playing the effect corresponding to the first effect in the at least one second livestreaming, the method further comprises:

determining whether the effect corresponding to the first effect interacts with an original lingering effect in the second livestreaming;

in a case of yes, interacting the effect corresponding to the first effect with the original lingering effect, and updating an effect of the original lingering effect and the battle numerical value effect; and in a case of no, generating, based on the effect corresponding to the first effect, a new lingering effect in the second livestreaming, generating effects based on the new lingering effect and the original lingering effect, respectively, and continuously generating battle numerical value effects.

7. The method according to claim 5, wherein after the playing the third effect in the first livestreaming, the method further comprises:

in response to determining the third effect interacting with an original lingering effect in the first livestreaming, updating an effect of the original lingering effect and the battle numerical value effect; and in response to determining the third effect not interacting with an original lingering effect in the first livestreaming, generating, based on the third effect, a new lingering effect in the second livestreaming, generating effects based on the new lingering effect and the original lingering effect, respectively, and not generating the battle numerical value effect.

8. The method according to claim 6, wherein the interacting comprises enhancement, mutation, or counteraction, and an enhancement effect, a counteraction effect, or a mutation effect, which correspond to the enhancement, the counteraction, or the mutation, respectively, are generated according to the interacting.

9. The method according to claim 7, wherein the interacting comprises mutation, and a mutation effect corresponds the mutation is generated according to the interacting.

10. The method according to claim 8, wherein the generating the enhancement effect, the counteraction effect, or the mutation effect, which correspond to the enhancement, the counteraction, or the mutation, respectively, according to the interacting comprises:

enhancing at least one effect corresponding to the first effect and at least one other effect corresponding to the first effect that are played in a same livestreaming, playing the enhancement effect, and playing a numerical value effect corresponding to numerical value superposition enhancement between effects that are capable of being enhanced;

counteracting at least one effect corresponding to the first effect with at least one third effect that are played in a same livestreaming, and playing the counteraction effect, and playing a numerical value effect corresponding to difference value counteraction between effects that are capable of being counteracted; and when a numerical value corresponding to the enhancement effect increases to a first threshold, playing a corresponding mutation effect and playing a corresponding numerical value effect, or when a numerical value corresponding to the counteraction effect decreases to a second threshold, playing a corresponding mutation effect and playing a corresponding numerical value effect.

11. The method according to claim 4, wherein after playing the effect corresponding to the first effect and/or the third effect, a battle numerical value effect is played during playing the effect corresponding to the first effect and/or the third effect or after the effect corresponding to the first effect and/or the third effect are played.

12. The method according to claim 11, wherein after the playing the effect corresponding to the first effect in the at least one second livestreaming, the method further comprises:

determining whether the effect corresponding to the first effect interacts with an original lingering effect in the second livestreaming;

in a case of yes, interacting the effect corresponding to the first effect with the original lingering effect, and updating an effect of the original lingering effect and the battle numerical value effect; and in a case of no, generating, based on the effect corresponding to the first effect, a new lingering effect in the second livestreaming, generating effects based on the new lingering effect and the original lingering effect, respectively, and continuously generating battle numerical value effects.

13. The method according to claim 1, wherein before playing the first effect and the second effect, the method further comprises:

identifying the effect type corresponding to the effect instruction.

14. The method according to claim 2, wherein the first type is opposite to the second type, the first effect and/or the fourth effect are effects of the first type, and the second effect and/or the third effect are effects of the second type.

15. The method according to claim 14, wherein the first type is an attack type, the first effect is an attack effect, the second type is a defense type, the third effect is a defense effect, and the second effect is an effect of being attacked or a defense effect.

16. The method according to claim 1, further comprising: at an end of a livestreaming battle stage, clearing lingering effects in all livestreaming parties; and calculating total points values corresponding to the all livestreaming parties, respectively, determining that a livestreaming with a highest total points value is a winner, and playing a winning effect in the livestreaming with the highest total points value.

17. An interactive apparatus, comprising:

a receiving module, configured to receive an effect instruction;

a first effect module, configured to, in response to an effect type corresponding to the effect instruction being a first type, play a first effect corresponding to a first livestreaming and play a second effect corresponding to at least one second livestreaming, wherein the effect instruction comprises an effect instruction triggered by receiving a gift in the first livestreaming, the first effect and the second effect are related to a type of the gift received in the first livestreaming;

in response to the type of the gift received in the first livestreaming indicating the effect type being the first type, playing the first effect in the first livestreaming and playing the second effect in the at least one second livestreaming, wherein the first effect and the second effect are different;

in response to the effect type corresponding to the effect instruction being a second type, playing a third effect in the first livestreaming; and playing corresponding interaction effects in the first livestreaming and the at least one second livestreaming, respectively;

wherein the interactive method further comprises:

in response to determining the third effect or the first effect interacting with an original lingering effect in the first livestreaming:

interacting the third effect or the first effect with the original lingering effect, wherein the interacting comprises enhancement or counteraction;

generating an enhancement effect or a counteraction effect which corresponds to the enhancement or the counteraction, respectively, according to the interacting;

wherein the effects corresponding to the first effect that are played in a same livestreaming are enhanced to generate the enhancement effect, at least one effect corresponding to the first effect and at least one third effect that are played in a same livestreaming are counteracted to generate the counteraction effect.

18. An electronic device, comprising:

a memory, configured to store a computer-readable instruction; and a processor, configured to execute the computer-readable instruction so as to enable the electronic device to implement the method according to claim 1.

19. A non-transitory computer-readable storage medium, wherein the computer-readable storage medium stores a program, when the program is executed, the method according to claim 1 is implemented.

* * * * *